(12) United States Patent
Gumpoltsberger

(10) Patent No.: US 6,855,085 B1
(45) Date of Patent: Feb. 15, 2005

(54) CONTINUOUSLY VARIABLE VEHICLE TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/089,476

(22) PCT Filed: Oct. 11, 2000

(86) PCT No.: PCT/EP00/09990

§ 371 (c)(1),
(2), (4) Date: Mar. 28, 2002

(87) PCT Pub. No.: WO01/29451

PCT Pub. Date: Apr. 26, 2001

(30) Foreign Application Priority Data

Oct. 16, 1999 (DE) .......................... 199 50 053

(51) Int. Cl.⁷ .............................................. F16H 37/02
(52) U.S. Cl. ....................................................... 475/211
(58) Field of Search ................................ 475/207, 208, 475/209, 210, 214, 216

(56) References Cited

U.S. PATENT DOCUMENTS

| | | | |
|---|---|---|---|
| 3,410,146 A | 11/1968 | Nordeen | 74/200 |
| 4,602,525 A * | 7/1986 | Moroto et al. | 475/210 |
| 4,682,518 A * | 7/1987 | Takada et al. | 475/209 |
| 4,706,518 A * | 11/1987 | Moroto et al. | 475/210 |
| 5,820,510 A * | 10/1998 | Ueda et al. | 475/215 |
| 5,888,160 A * | 3/1999 | Miyata et al. | 475/216 |
| 5,890,987 A * | 4/1999 | Lamers | 475/210 |
| 6,019,695 A | 2/2000 | Kobayashi | 475/204 |
| 6,217,473 B1 * | 4/2001 | Ueda et al. | 475/216 |
| 6,251,038 B1 * | 6/2001 | Ishikawa et al. | 475/216 |
| 6,283,888 B1 * | 9/2001 | Hirano | 475/216 |

FOREIGN PATENT DOCUMENTS

| | | | | |
|---|---|---|---|---|
| DE | 29 48 194 | | 6/1980 | F16H/37/06 |
| DE | 197 80 383 T1 | | 4/1998 | B60K/17/34 |
| DE | 198 58 553 A1 | | 6/2000 | F16H/37/08 |
| EP | 0 199 533 A1 | | 10/1986 | F16H/37/04 |
| EP | 0 184 675 B1 | | 3/1990 | F16H/37/02 |
| EP | 0 787 927 A2 | | 8/1997 | F16H/37/02 |
| GB | 2 045 368 A | | 10/1980 | B60K/17/04 |
| JP | 61-103055 A | | 5/1986 | F16H/37/02 |

* cited by examiner

Primary Examiner—Dirk Wright
(74) Attorney, Agent, or Firm—Davis & Bujold, P.L.L.C.

(57) ABSTRACT

A continuously variable vehicle transmission (1) having one variator (2), for ex., a belt drive transmission, for continuous ratio adjustment and a multi-step transmission (4), for ex., a planetary transmission having at least one input and one output shaft (7, 8) and at least two forward gears and at least one reverse gear. According to the invention a reversal of direction of rotation takes place between the input and the output shaft (7, 8) in the multi-step transmission (4) by means of the two or more gears and the reverse gear(s) is/are designed so that no reversal of direction of rotation occurs between the input and the output shaft (7, 8).

18 Claims, 3 Drawing Sheets

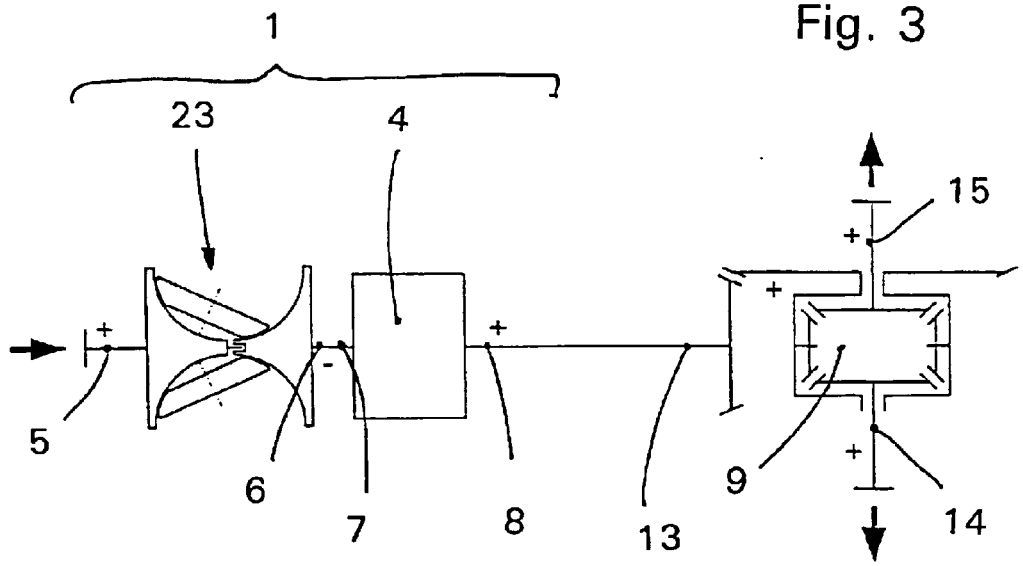
Fig. 3
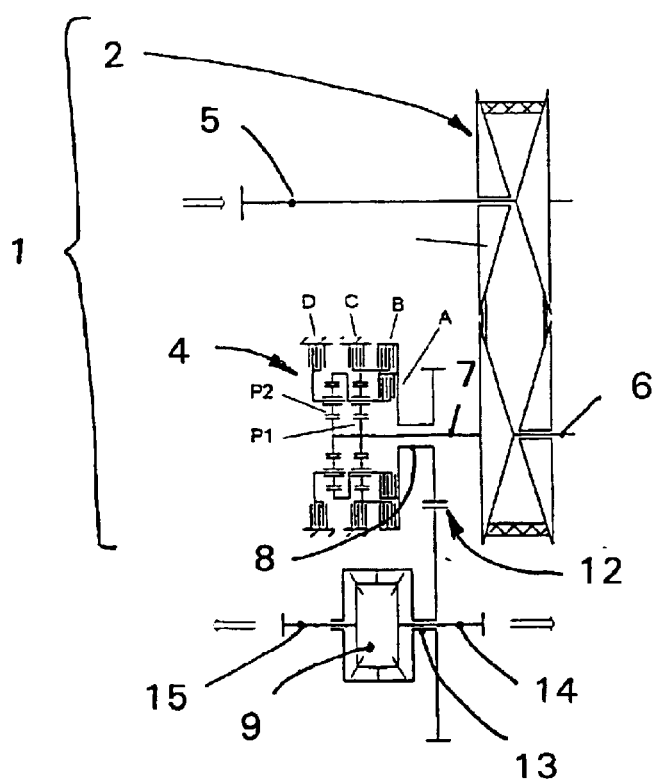
Fig. 4
Fig. 5

CONTINUOUSLY VARIABLE VEHICLE TRANSMISSION

FIELD OF THE INVENTION

The invention relates to a continuously variable vehicle transmission having one variator such as a toroidal drive or a cone pulley belt drive for continuously variable ratio and a multi-step transmission having at least one input and one output shaft and at least two forward gears and at least one reverse gear.

BACKGROUND OF THE INVENTION

A similar arrangement is known from the Applicant's DE 198 58 553. It discloses a combination of one variator, one planetary transmission and a rear-mounted differential which distributes the driving power over two drive shafts. The power is branched behind the transmission input via a first branch to the variator and via a second branch and one other ratio step to the planetary transmission.

Vehicle transmissions of that kind are also known, in general, from the prior art where a planetary transmission is rear-mounted on the continuously variable transmission, for example, a belt drive transmission. Said planetary transmissions are usually connected via two other spur gear sets with the axle differential of a motor vehicle, since the input and the output shafts of the planetary transmission have the same positive direction of rotation for the forward drive range and the positive direction of rotation is relayed via the inserted spur gear sets so that the drive axles connected with the axle differential also effect a positive direction of rotation during forward drive of the motor vehicle.

Vehicle transmission of that kind are subject to a constant further development regarding reduction of construction cost or increase of comfort for the user of a motor vehicle equipped with such a transmission.

It is, therefore, the problem on which this invention is based to indicate a design of a vehicle transmission which makes possible, on one hand, a lower construction cost and, on the other, an increase of comfort for the driver of a vehicle equipped with such a transmission. The reliability and the service life of the transmission are also to be increased.

SUMMARY OF THE INVENTION

It is proposed, in a vehicle transmission of the above kind, that between the input and the output shafts of the multi-step transmission a reversal of direction of rotation takes place by means of at least two forward gears and that the reverse gear(s) be designed without reversal of direction of rotation between the input and the output shafts of the transmission. Thereby is obtained in the first place that an advantageously lower construction cost be required compared to the known vehicle transmission with two driving ranges. By virtue of the reversal of direction of rotation within the transmission between the input and the output shafts, the formerly double spur gear set between the transmission and the rear-mounted axle differential is reduced to a single spur gear set. Secondly, the invention proposes a solution which makes possible a lesser variator spreading with a larger total spreading compared to one-range transmissions. Besides, an optimum variator rotational speed is possible in the main drive ranges which are divided, for example, in a city and a cross-country range.

In a specially advantageous development of the invention, it is proposed that a variator is specially provided a cone pulley belt drive transmission or a reversing toroidal drive wherein the input and output shafts of the variator have the same direction of rotation and on the multi-step transmission there is rear-mounted, for reversal of direction of rotation, a device such as a simple spur gear set with a rotational speed ratio. Thereby the negative direction of rotation of the output shaft of the transmission during forward drive of the motor vehicle is, on one hand, reversed to a positive direction of rotation and, on the other, a rotational speed ratio is made possible, at the same time, by said spur gear set.

The shafts of the variator and the multi-step transmission, the same as the wheel axles connected with the axle differential, are disposed side by side in parallel. Thereby a compact construction is advantageously made possible.

In one other advantageous design of the invention, it is provided that the variator be specially designed as a one-way toroidal drive wherein a reversal of direction of rotation takes place in the variator between the input and the output shaft. Such as arrangement is advantageous for vehicles with low power range.

The shafts of the one-way variator, the same as of the multi-step transmission, are disposed coaxially and consecutively relative to each other so that the wheel axle of the rear-mounted axle differential extends at right angle relative to the input shaft.

The input and output shafts of the transmission are advantageously coaxial to each other and situated on one or both sides of the housing of the transmission. Thereby an adaptation of the transmission to the most different installation conditions in a motor vehicle is easily made possible.

The multi-step transmission is advantageously designed as planetary transmission wherein a shift clutch of the multi-step transmission can also be advantageously designed as starting clutch. Alternatively, an external clutch can also be used, such as a wet starting clutch or a dry friction clutch, a hydrodynamic converter or also any other starting element, for example, a magnetic clutch, an E-motor, or the like.

The multi-step transmission is advantageously designed power shiftably so that by means of multi-disk clutches a shift under load can be effected without interruption of the traction. Alternatively, a shift can also occur with traction interruption, with synchronizations, or also with a dog clutch.

The reduction ratio of the reverse gear is advantageously unlike one and, in particular, amounts to about three so that a total or starting ratio of the inventive vehicle transmission of about fifteen can be obtained. Both forward drive ranges of the vehicle transmission are designed so as to have a cutting zone so that a "city range" and a "cross-country range" can be implemented. By this overlapping of the ranges, it is advantageously possible to prevent a frequent reversal of the ranges and an optimum variator speed is always made possible in the main drive ranges.

It is advantageously provided to effect a change of the drive range as compound shift so that a stepped shift in the multi-step transmission and a ratio adjustment of the variator simultaneously occur. Thus, when shifting, for example, from the first to the second range, a shifting is effected wherein the total ratio of the vehicle transmission remains constant.

BRIEF DESCRIPTION OF THE DRAWINGS

The invention will now be described, by way of example, with reference to the accompanying drawings in which:

FIG. 3 shows a continuously variable vehicle transmission with a one-way toroidal drive and a rear-mounted transmission, the same as an axle differential;

FIG. 4 shows a transmission similar to the representation in FIG. 1 but with a detailed diagrammatic representation of the planetary transmission;

FIG. 5 shows the switching system for a planetary transmission according to the representation in FIG. 1.

DETAILED DESCRIPTION OF THE INVENTION

Figure 1:
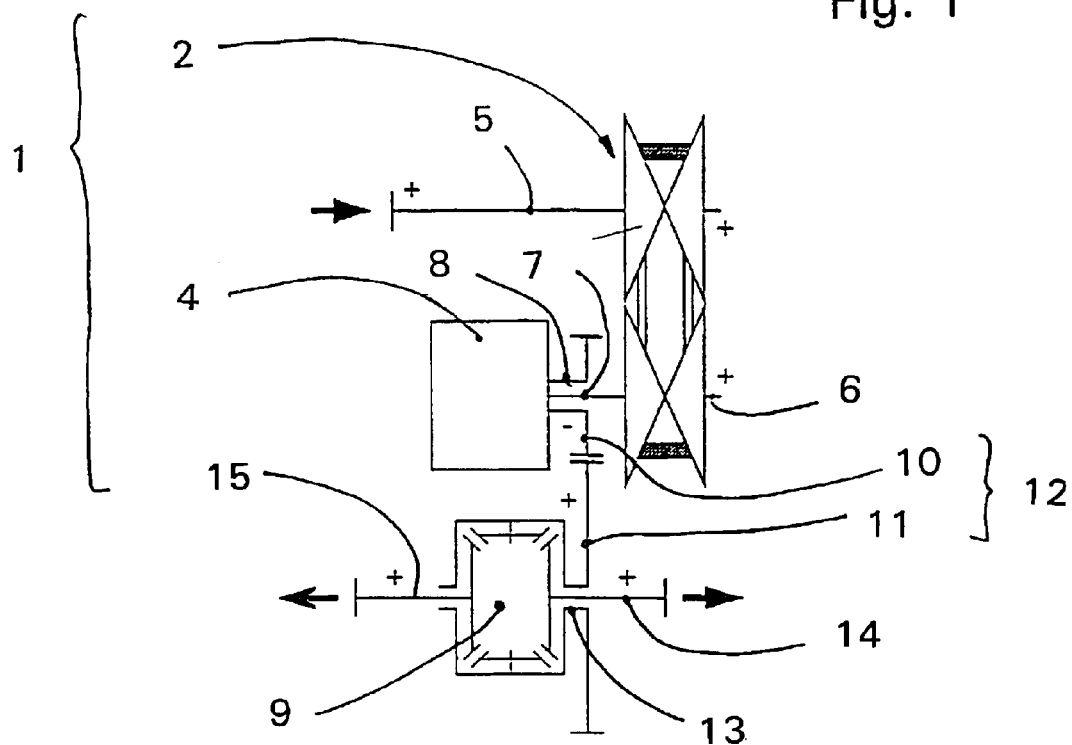
FIG. 1 diagrammatically shows a continuously variable vehicle transmission with a belt drive transmission and a rear-mounted transmission.

The continuously variable vehicle transmission 1 (FIG. 1) consists of one belt-drive transmission 2 as variator and rear-mounted thereon one multi-step transmission 4 which is specially designed as planetary transmission. Said continuously variable transmission is connected via a spur gear set 12 with a rear-mounted axle differential 9 for driving the wheel axles 14, 15 of a motor vehicle.

The driving power (shown by an arrow in FIG. 1) is transmitted by the input shaft 5, via the variator 2, to the variator output shaft 6; at the same time, the latter constitutes the input shaft 7 of the transmission 4. The positive direction of rotation of the input shaft 5 of the variator 2 remains positive up to the input shaft 7 of the transmission 4. In the transmission 4, as reversal of direction of rotation occurs in the forward drive ranges so that the output shaft 8 of the transmission 4 has a negative direction of rotation. The latter is reversed by means of the pinion 10 and of the wheel 11 again to a positive direction of rotation and via the input shaft 13 of the axle differential 9 is conveyed to the latter. During forward drive of the motor vehicle, the driving power leaves the axle differential 9 in positive direction of rotation via both wheel axles 14, 15.

Figure 2:
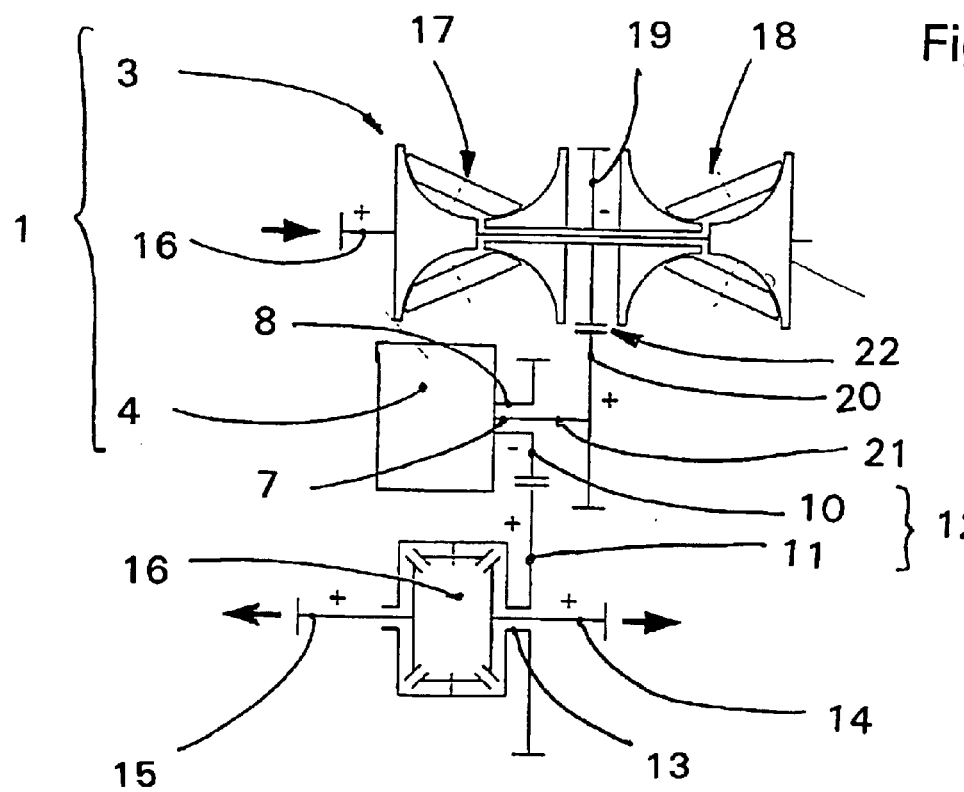
FIG. 2 diagrammatically shows a continuously variable vehicle transmission with a two-way toroidal drive and a rear-mounted transmission.

In the alternative, possible designs of the invention that follow, the same parts are identified with the same reference numerals insofar as this applies. The two-way toroidal drive 3 (FIG. 2) is driven, via the input shaft 16, in positive direction of rotation. Via both toroidal units 17 and 18, a continuously variable ratio occurs upon the spur gear 19 situated between the two toroidal units 17, 18 which has a negative direction of rotation. The latter is reversed to positive direction of rotation, via the spur gear set 22, with the spur gear 20 upon the output shaft 21 of the variator 3. The input shaft 7 of the transmission 4 and the rear-mounted parts and directions of rotation again correspond to the representation and description of FIG. 1.

In the possible arrangements described above of the continuously variable vehicle transmission 1, the input shaft 5 of the variator 2, the input shaft 7 of the transmission 4 and the wheel axles 14 and 15 are disposed side by side in parallel in three-shafts construction. Alternatively an arrangement in standard construction is indicated in FIG. 3, that is, the shafts of the input shaft 5 of the variator 23 up to the input shaft 13 of the axle differential 9 are disposed coaxially consecutively. The variator 23 (FIG. 3) is designed as one-way toroidal drive so that the positive direction of rotation of the input shaft 5 is reversed to a negative direction of rotation of the output shaft 6. The input shaft 7 of the transmission 4 thus rotates also in negative direction of rotation. According to the invention, the direction of rotation within the transmission 4—for the forward drive ranges—is reversed to a positive direction of rotation of the output shaft 8. This positive direction of rotation is relayed via the input shaft 13 of the axle differential 9 to the wheel axles 14 and 15.

The transmission 4 (FIG. 4) is designed, for example, as two-speed planetary gear. Here are provided four clutches A, B, C, D for shifting the two forward drive ranges V1 and V2, the same as the reverse drive range R (FIG. 5). The clutches A and D are shifted for the first forward drive range V1. To shift from the first to the second driving range V2, the clutch B is shifted instead of A. The clutch D remains closed. In the reverse drive range R, the clutches A and C are shifted.

Figure 6:
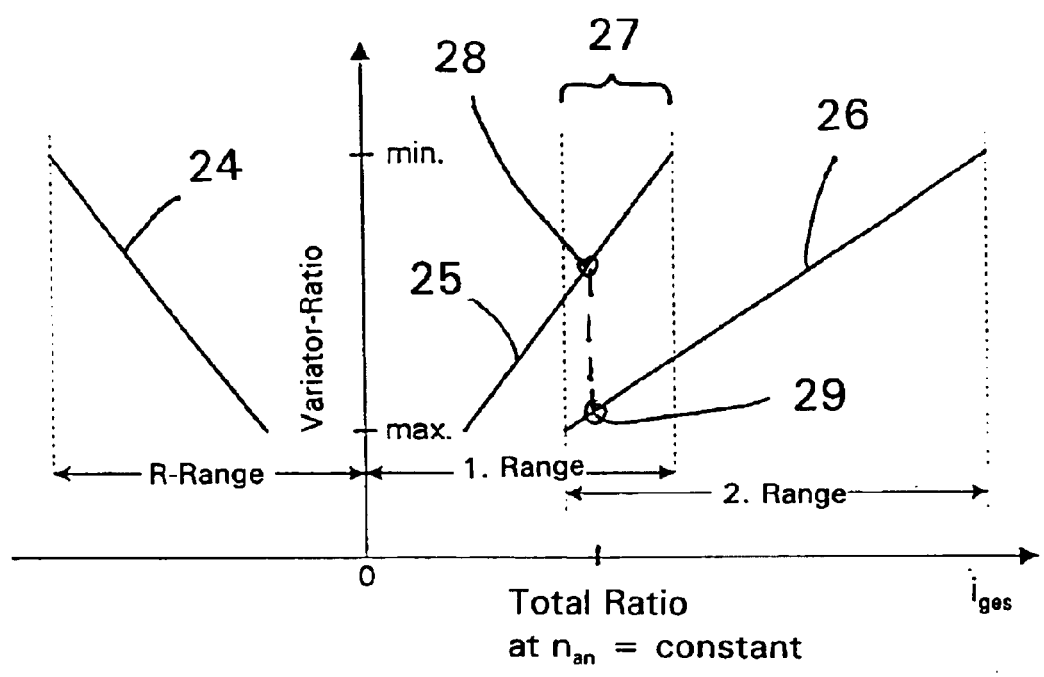
FIG. 6 shows a graphic representation of the variator ratio relative to the total ratio for the three drive ranges.

In FIG. 6 is shown upon the abscissa the total ratio i_ges of the continuously variable vehicle transmission at a constant driving rotational speed n_an. The variator ratio is shown upon the ordinate. The total ratio i_ges is divided in three driving ranges, the negative total ratio of the reverse driving range being covered with the reverse driving ratio 24. The positive total ratio in the forward drive range is reproduced in a first range with the first forward drive ratio 25, the same as the second forward drive range with the second forward drive ratio 26. Said two ranges 25 and 26 are laid out so as to overlap in an intersection area 27, that is, a "city range" and a "cross-country range" can be implemented.

The shifting according to the invention takes place as compound power shift, there simultaneously occurring a stepped shifting in the multi-step transmission and a ratio adjustment of the variator. Even through this results in a momentary collapse during the shifting, no change of the total ratio i_ges results, that is, the motor rotational speed does not change. This can be seen by the fact that the total ratio i_ges at the shifting point 28 of the first forward drive range 25 is identical with the ratio i_ges adjusted after the shifting point 29 of the second forward drive range.

REFERENCE NUMERALS 1 vehicle transmission, continuously variable
2 variator/belt drive transmission
3 variator/toroidal drive, two-way
4 transmission, multi-step
5 input shaft
6 output shaft
7 input shaft
8 output shaft
9 axle differential
10 pinion
11 wheel
12 spur gear set
13 input shaft
14 wheel axle
15 wheel axle
16 input shaft
17 toroidal unit
18 toroidal unit
19 spur gear
20 spur gear
21 output shaft
22 spur gear step
23 variator/toroidal drive, one-way
24 reverse ratio
25 first forward ratio 26 second forward ratio
27 overlapping area
28 shifting point
29 shifting point

What is claimed is:

1. A continuously variable vehicle transmission (1) having a variator transmission (2, 3, 23) for continuously variable ratio adjustment and transfer of power sequentially in series along a single power flow path to a multi-step transmission (4) having at least one input shaft (7), an output shaft (8) and at least two forward gears and at least one reverse gear,
wherein said input shaft (7) and said output shaft (8) rotate in opposite directions of rotation when said multi-step transmission (4) is operating in any of the at least two forward gears and said input shaft (7) and said output shaft (8) rotate in the same direction of rotation when said multi-step transmission (4) is operating in the at least one reverse gear.

2. The continuously variable vehicle transmission according to claim 1, wherein the variator comprises one of a cone pulley belt drive transmission (2) and a two-way toroidal drive (3); a variator input shaft (5, 16) and a variator output shaft (6, 21) have the same direction of rotation, and a gear set (12) reversed the rotational direction of the output shaft (8) of the multi-step transmission (4).

3. The continuously variable vehicle transmission according to claim 2, wherein said variator input shaft (5, 16) and said output shaft (6, 21) of said multi-step transmission (4) are disposed side by side and parallel with one another.

4. The continuously variable vehicle transmission according to claim 1, wherein said variator is a one-way toroidal drive (23) and a reversal in the direction of rotation takes place in said variator between a variator input shaft (5) and a variator output shaft (6) of a toroidal drive (23).

5. The continuously variable vehicle transmission according to claim 4, wherein variator input and output shafts (5, 6) and said input and output shafts (7, 8) of said multi-step transmission (4) are disposed consecutively and coaxially with one another.

6. The continuously variable vehicle transmission according to claim 1, wherein said input shaft (7) and said output shaft (8) of said multi-step transmission (4) are coaxial with one another and situated on opposite sides of a housing of said transmission (4).

7. The continuously variable vehicle transmission according to claim 1, wherein said multi-step transmission (4) is a planetary transmission.

8. The continuously variable vehicle transmission according to claim 1, wherein a shift clutch of said multi-step transmission (4) is a starting clutch.

9. The continuously variable vehicle transmission according to claim 1, wherein said multi-step transmission (4) is a power-shift transmission.

10. The continuously variable vehicle transmission according to claim 1, wherein the two forward gears are shiftable and have an overlapping range (27).

11. The continuously variable vehicle transmission according to claim 2, wherein the two forward gears are shiftable and have an overlapping range (27).

12. The continuously variable vehicle transmission according to claim 11, wherein a change of the the two forward gears as group shifting is possible with a stepped shift in said multi-step transmission (4) and a ratio adjustment of said variator (2, 3, 23) simultaneously occurring.

13. The continuously variable vehicle transmission according to claim 1, wherein said input shaft (7) and said output shaft (8) of said multi-step transmission (4) are coaxial with one another and situated on the same side of a housing of said transmission (4).

14. A continuously variable vehicle transmission (1) comprising a variator transmission (2, 3, 23), for continuously variable ratio adjustment, sequentially connected with a multi-step transmission (4) having at least one input shaft (7) and an output shaft (8), and the multi-step transmission (4) has at least two forward gears and at least one reverse gear and being sequentially connected with an axial differential (9), whereby driving power passes along a single power flow path sequentially from the variator transmission (2, 3, 23) to the multi-step transmission (4) and from the multi-step transmission (4) the axial differential (9);
wherein an output shaft (6) of the variator is coaxial with the input shaft (7) of the multi-step transmission (4), and during operation of the multi-step transmission (4) in the at least two forward gears, the input shaft (7) and the output shaft (8) rotate in opposite directions of rotation, and, during operation of the multi-step transmission (4) in the at least one reverse gear, the input shaft (7) and the output shaft (8) rotate in the same direction of rotation.

15. A continuously variable vehicle transmission (1) comprising a variator transmission (2, 3, 23), for continuously variable ratio adjustment, sequentially connected with a multi-step transmission (4) having at least one input shaft (7) and an output shaft (8), and the multi-step transmission (4) has at least two forward gears and at least one reverse gear and being sequentially connected with an axial differential (9), whereby driving power passes along a single power flow path sequentially from the variator transmission (2, 3, 23) to the multi-step transmission (4) and from the multi-step transmission (4) the axial differential (9);
wherein the multi-step transmission (4) is a double planetary gear and, during operation of the multi-step transmission (4) in the at least two forward gears, the input shaft (7) and the output shaft (8) rotate in opposite directions of rotation, and, during operation of the multi-step transmission (4) in the at least one reverse gear, the input shaft (7) and the output shaft (8) rotate in the same direction of rotation, and the output shaft (8) of the multi-step transmission (4) supports a gear and an input to the axial differential (9) supports a gear which directly mates with the gear supported by the output shaft (8) so as to reverse the rotational direction of the driving power outputted from the multi-step transmission (4).

16. The continuously variable vehicle transmission (1) according to claim 15, wherein the input shaft (7) supports a fixed first sun gear spaced apart from a fixed second sun gear.

17. The continuously variable vehicle transmission (1) according to claim 15, wherein the input shaft (7) supplies drive via a first side of the multi-step transmission (4), and the output shaft (8) outputs drive from the multi-step transmission (4) via the first side, and the output shaft (8) is hollow which surrounds and is concentric with the input shaft (7).

18. The continuously variable vehicle transmission (1) according to claim 15, wherein the input shaft of the variator,
the input shaft of the transmission; and
wheel axles for driving a set of wheels are all disposed adjacent and parallel to one in a three-shaft construction.

* * * * *